United States Patent [19]

Ito et al.

[11] 4,441,572

[45] Apr. 10, 1984

[54] METHOD AND A SYSTEM FOR STEERING A WHEELED VEHICLE

[75] Inventors: Hideo Ito, Zushi; Namio Irie, Yokohama, both of Japan

[73] Assignee: Nissan Motor Company, Limited, Yokohama, Japan

[21] Appl. No.: 305,794

[22] Filed: Sep. 25, 1981

[30] Foreign Application Priority Data

Nov. 18, 1980 [JP] Japan .................. 55-161327

[51] Int. Cl.³ .............................................. B62D 5/06
[52] U.S. Cl. ..................... 180/140; 180/79.1; 180/143
[58] Field of Search ............... 180/140, 141, 142, 143, 180/79.1

[56] References Cited

U.S. PATENT DOCUMENTS

| | | | |
|---|---|---|---|
| 3,387,684 | 6/1968 | Belke et al. | 180/79.1 |
| 3,455,408 | 7/1969 | Larsen | 180/79.1 |
| 3,897,846 | 8/1975 | Inoue | 180/142 |
| 3,933,215 | 1/1976 | Scheuerle | 180/23 |
| 4,105,086 | 8/1978 | Ishie et al. | 180/143 |
| 4,175,638 | 11/1979 | Christensen | 180/140 |
| 4,263,979 | 4/1981 | Sturgill | 180/79.1 |
| 4,335,800 | 6/1982 | Arato | 180/236 |

FOREIGN PATENT DOCUMENTS

| | | | |
|---|---|---|---|
| 2083422 | 3/1982 | United Kingdom | 180/141 |
| 734049 | 5/1980 | U.S.S.R. | 180/140 |

*Primary Examiner*—David M. Mitchell
*Assistant Examiner*—Donn McGiehan
*Attorney, Agent, or Firm*—Lane, Aitken & Kananen

[57] ABSTRACT

A method and system for steering a wheeled vehicle having a pair of rear steering road wheels, a pair of front steering road wheels, and a steering wheel for controlling a steering force applied to the pair of front steering wheels, wherein the pair of rear steering wheels is steered through an angle $\delta r$ proportioned at a ratio k to the angle $\delta f$ through which the pair of front steerable road wheels is steered and wherein the ratio k is given by $$(A - B \cdot V^2)/(C - D \cdot V^2)$$

wherein V is a detected vehicle speed and A, B, C and D are predetermined parameters, and $\delta f$ is given by $$e \cdot \delta f_D/(1+k)$$

when $\delta f_D$ is the angle through which the steering wheel is turned and e is a constant.

7 Claims, 5 Drawing Figures

METHOD AND A SYSTEM FOR STEERING A WHEELED VEHICLE

BACKGROUND OF THE INVENTION

The present invention relates to a method and a system for steering a wheeled vehicle, and more particularly a method and a system for steering a wheeled vehicle of the type having a pair of rear steerable road wheels, a pair of front steerable road wheels, and a steering wheel, wherein the angle through which the pair of rear steerable road wheels is steered is in a functional relationship to the angle through which the pair of front steerable road wheels is steered for controlling a steering force applied to the pair of front steering road wheels.

In ordinary automotive vehicles, only the front road wheels or the rear road wheels are steerable. Some vehicles, such as those having exceptionally elongated wheel bases, use two or more pairs of steerable road wheels. These pairs of steerable road wheels are coupled together either mechanically or through hydraulic circuits. One pair of steerable road wheels is steered by human intervention and another pair of steerable road wheels is steered through an angle proportional to the angle through which the former pair of road wheels is steered. At low speeds, this angle is in the opposite direction of the angle of the former wheels. As speed increases, the angle decreases until the polarity of this angle matches that of the former wheels. A vehicle having such a set of steerable road wheels is capable of being steered through a sharp turn at a low speed where ample space is not available for maneuvering the vehicle.

When a vehicle of this type is making a turn, the vehicle is subject to not only yawing motion but side slip about a vertical axis which passes through the center of gravity of the vehicle. Due to the side slip thus involved in a turning maneuver of the vehicle, the vehicle is not capable of maintaining travel in a direction tangential to the turning circle so that the vehicle driver does not have complete control over the direction in which the vehicle is to advance.

Since, furthermore, the side acceleration of the vehicle as sensed by the vehicle driver does not conform to the centrifugal acceleration of the vehicle making a turn, the vehicle driver is compelled to maneuver the vehicle with a strained sensation.

The present invention contemplates elimination of these drawbacks thus far encountered in a vehicle using two or more pairs of steerable road wheels.

According to this method, however, as the vehicle speed increases, the yawing rate gain, defined as the yawing rate divided by the front wheel steering angle, decreases. If the vehicle is travelling on a level surface at a speed V (meters per second), the theoretical relationship between the yawing rate r (radians per second) and radius of the turning circle R (meters) can be shown to be:

$$R = V/r$$

Consequently, when the speed of the vehicle increases but the yawing rate is not increased, the radius of the turning circle cannot be kept constant but tends to increase, causing apparent under-steering characteristics to develop.

As is obvious from above, when the rear wheels are steered so as to make the side-slip angle small, with increasing vehicle speed, apparent high severe understeering is developed. Consider the case of vehicles at different speeds on a bend on a high-speed road. While intending to turn in a circle of constant radius while steering at a constant steering angle, the bad situation is created in which as the speed gradually increases, the rear wheels move into alignment with the front wheels and the radius of the turning circle increases. Consequently, if the speed drops due to braking while turning and maintaining a constant steering angle, the rear wheels turn so as to be in a different direction from the front wheels, and an undesirable condition known as "tack-in" will occur in which the vehicle is misaligned with the direction of travel or similar phenomena. The present invention also eliminates these drawbacks.

SUMMARY OF THE INVENTION

In accordance with the present invention, there is provided a method of steering a wheeled vehicle having a pair of rear steerable road wheels, a pair of front steerable road wheels, and a steering wheel for controlling a steering force applied to the pair of front steerable road wheels, wherein the pair of rear steerable road wheels is steered through an angle $\delta r$ proportioned at ratio k to the angle $\delta f$ through which the pair of front steerable road wheels is steered and wherein the ratio k is given by $$(A - B \cdot V^2)/(C - D \cdot V^2)$$

wherein V is a detected vehicle speed and A, B, C and D are predetermined parameters, and $\delta f$ is given by $$e \cdot \delta f_D/(1+k)$$

where $\delta f_D$ is the angle through which the steering wheel is turned and e is a constant.

In accordance with the present invention, there is also provided a system for steering a wheeled vehicle having a pair of rear steerable road wheels, a pair of front steerable road wheels, and a steering wheel for controlling a steering force applied to the pair of front steerable wheels. The system comprises a control unit responsive to the signals representing the vehicle speed V and the steering angle $\delta f$ from a vehicle-speed sensor and a steering wheel angle sensor, respectively, for producing a rear wheel control signal to represent the angle $\delta r$ through which the pair of rear steerable wheels are to be steered, the angle $\delta r$ being given by $$K \cdot \delta f$$

where $\delta f$ is the angle through which the pair of front steerable road wheels are steered, and k is $(A - B \cdot V^2)/(C - 1 D \cdot V^2)$ where A, B, C and D are predetermined parameters.

The control unit further produces a front wheel control signal in accordance with the vehicle speed and the steering angle to represent the angle $\delta f$ through which the pair of front steerable wheels are to be stored, the angle $\delta f$ being given by $$e \cdot \delta f_D/(1+k)$$

where e is a constant and $\delta f_D$ is the angle through which the steering wheel is turned. The system includes a rear servomechanism responsive to the rear wheel control signal to steer the pair of rear steerable road wheels to the angle $\delta r$ and a front servomechanism responsive to the front wheel control signal to steer the pair of front steerable road wheels to the angle $\delta f$.

BRIEF DESCRIPTION OF THE DRAWINGS

Objects, features, and advantages of the present invention will be apparent from the description of a preferred embodiment thereof, taken in conjunction with the accompanying drawings in which.

DETAILED DESCRIPTION OF THE PREFERRED EMBODIMENT

Figure 1:
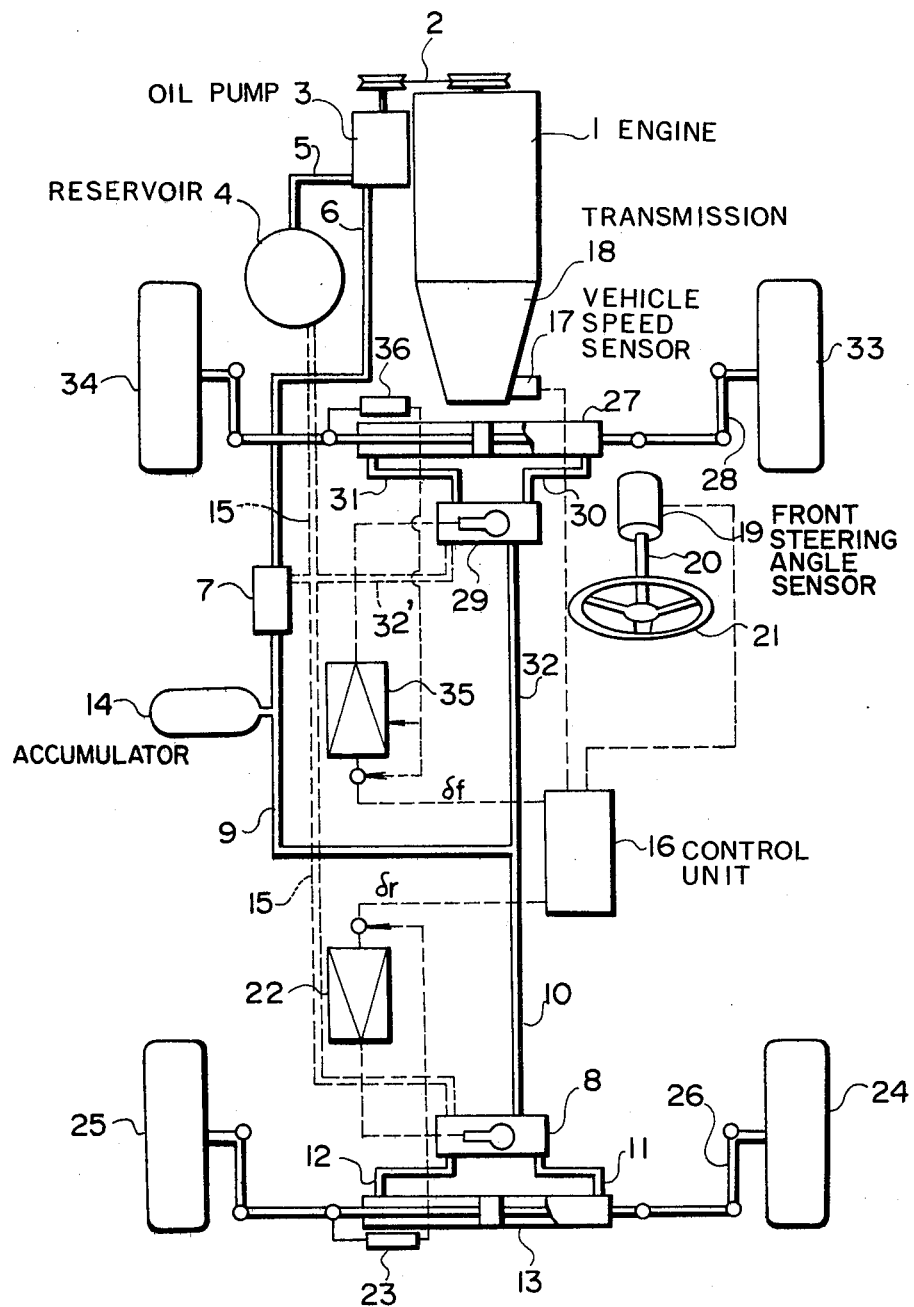
FIG. 1 is a diagrammatic view of a preferred embodiment of a steering system according to the present invention used in a 4-wheeled vehicle.
Figure 2:
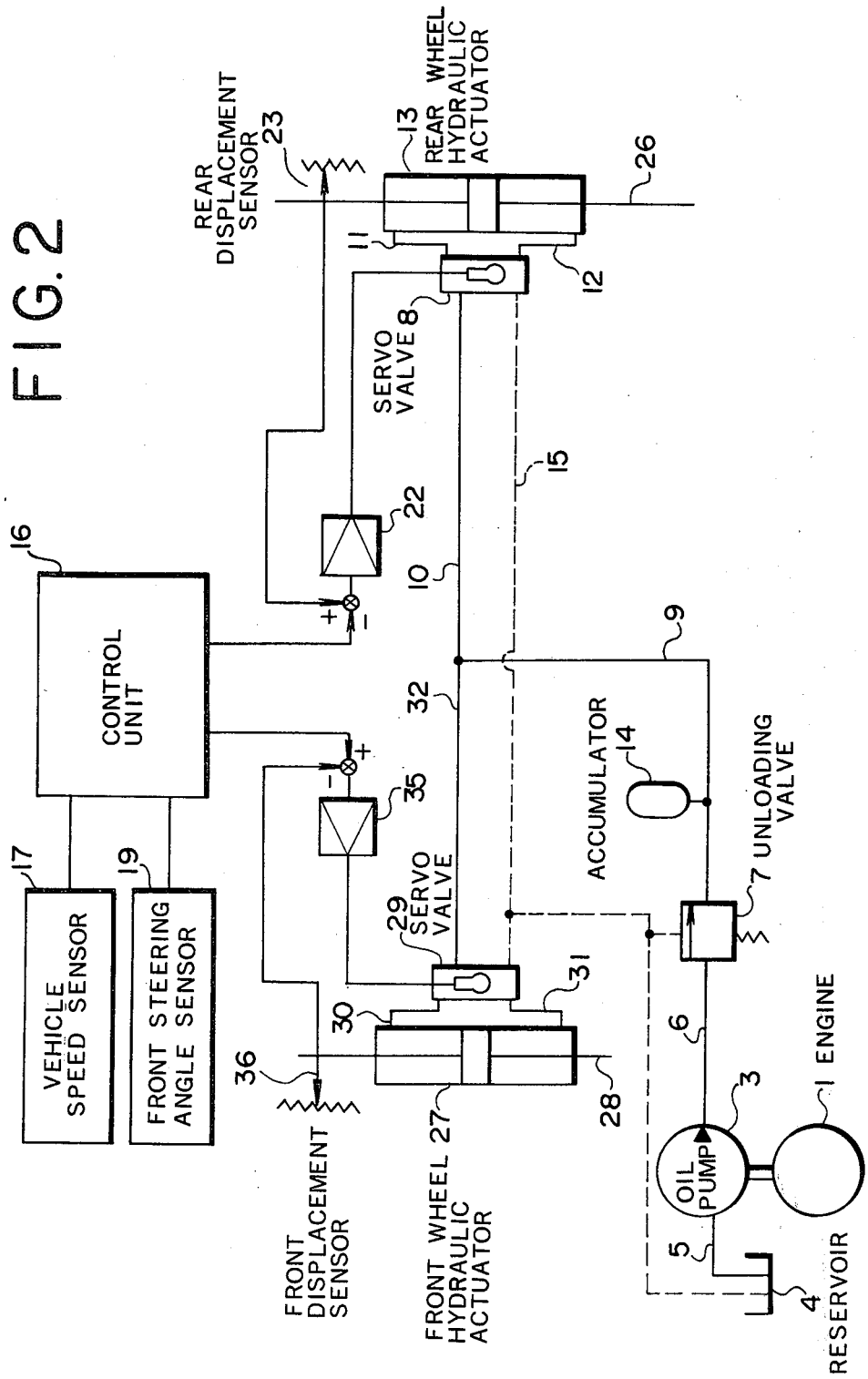
FIG. 2 is a schematic diagram of the system of FIG. 1.

In FIGS. 1 and 2, a preferred embodiment of a steering system according to the invention is shown. The system includes an engine 1 which drives by means of a belt pulley gearing system 2 an oil pump 3 to pump hydraulic oil from a reservoir 4 through supply lines 5 and 6 to an unloading valve 7 and thence to an electromagnetically operated rear servo valve 8 through supply lines 9 and 10. Hydraulic oil is further fed from the valve 8 through a supply line 11 or 12 into either the right-hand or left-hand chamber of a rear wheel hydraulic actuator 13 in the form of a piston and cylinder assembly. An accumulator 14, connected to the line 9, serves to maintain constant the oil pressure fed from the unloading valve 7 through the accumulator oil supply line 9. The hydraulic oil from the servo valve 8 returns through a return line 15 to the reservoir 4. An electric control unit 16 accepts input signals from a vehicle speed sensor 17 installed in the transmission 18 and from a steering-wheel steering angle sensor 19 installed in the column 20 of the steering wheel 21, and calculates and produces a rear steering angle control signal $\delta r$ which drives the servo valve 8 through a rear servo amplifier 22. A rear displacement sensor 23, which may be mounted to the actuator 13, senses the steering angle of the rear wheels 24, 25 actuated through a rear wheel steering linkage 26 by the actuator 13 and is connected electrically back to the input of the servo amplifier 22 to send thereto a feed-back signal indicating the steering angle.

A front wheel hydraulic actuator 27 in the form of a piston and cylinder assembly, similar to the rear wheel hydraulic actuator 13, is provided so as to operate a front wheel steering linkage 28. A front wheel steering servo valve 29 which controls the supply of hydraulic oil to the right-hand and left-hand chambers of the actuator 27 through lines 30 and 31 is connected to the hydraulic oil supply lines 9 and 12. The hydraulic oil from the servo valve 29 returns through a line 32' and the line 15 to the reservoir 4. Thus the servo valve 29 serves to supply oil to either the left-hand or right-hand chamber of the actuator 27 to steer the front wheels 33 and 34.

A front servo amplifier 35, which controls the front wheel steering servo valve 29, receives a front wheel steering angle signal $\delta f$ from the control unit 16. A front displacement sensor 36 which senses the front wheel steering angle is mounted to the front wheel hydraulic actuator 27, thereby forming a closed loop position control system which feeds back the output signal from the displacement sensor 36 to the input of the servo amplifier 35.

It will be assumed that the effect of rolling angle of the turning vehicle is negligible and that the effect of the difference of sprung weight on radially outside and radially inside wheels is also negligible. The vehicle under consideration can thus be modelled as a 4-wheeled vehicle having two degrees of freedom involving a yawing motion about a vertical axis and a side slip motion perpendicular to the axis of the turning motion of the vehicle.

Figure 3:
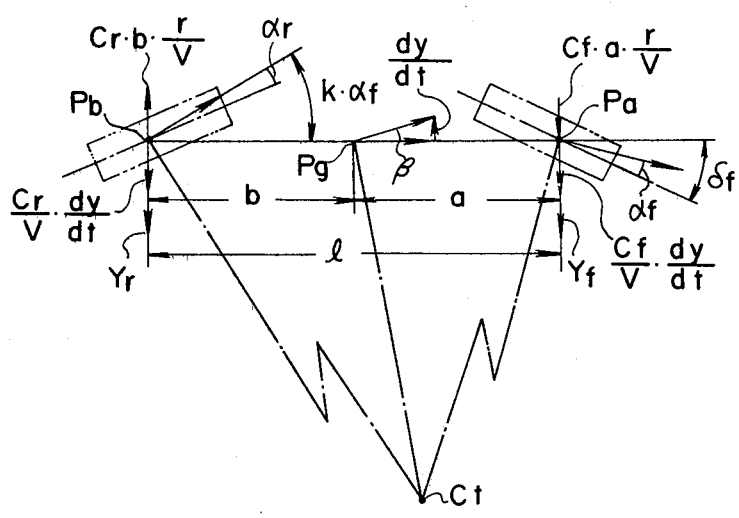
FIG. 3 is a geometric representation of one side of a 4-wheeled vehicle for illustrating parameters involved in steering the vehicle.

In FIG. 3:

l: the wheel base of the vehicle;
Pa: the center axis of the front axle;
Pb: the center axis of the rear axle;
Pg: the center of gravity of the vehicle, as shown as being present along the axis of the wheel base for convenience's sake;
a: the distance between the center axis of the front axle Pa and the center of gravity Pg of the vehicle;
b: the distance between the center axis of the rear axle Pb and the center of gravity Pg of the vehicle;
Ct: the center of rotation of the vehicle turning;
Cf: the cornering power of the front wheel;
Cr: the cornering power of the rear wheel;
Yf: the cornering force of the front road wheel;
Yr: the cornering force of the rear road wheel;
$\gamma$: the yawing rate of the vehicle;
y: the lateral displacement of the center of gravity Pg of the vehicle;
$\alpha f$: the slip angle of the front road wheel with respect to the fore-and-aft direction of the vehicle;
$\alpha r$: the slip angle of the rear road wheel with respect to the fore-and-aft direction of the vehicle;
$\beta$: the side slip angle of the vehicle at the center of gravity Pg with respect to the fore-and-aft direction of the vehicle;
$\delta r$: the rear-wheel steering angle through which the front wheel is steered; and
$\delta f$: the front-wheel steering angle through which the front road wheel is steered.

Assuming, now, that the rear road wheel of the vehicle under consideration is being steered through the angle which is k times the steering angle $\delta f$ through which the front road wheel is steered, the following equations of motion hold with respect to the vehicle:

$$M\left(\frac{d^2y}{dt^2} + V \cdot \gamma\right) = Yf + Yr, \text{ and} \qquad \text{Eq. 1}$$

$$Iz \cdot \frac{d\gamma}{dt} = a \cdot Yf - b \cdot Yr,$$

where M is the total sprung mass of the vehicle, V is the vehicle speed, and Iz is the angular moment of inertia of the vehicle which is yawing about a fixed vertical axis at the rate $\gamma$ and where $$Y_f = -C_f \cdot \alpha_f = -C_f \left( \frac{dy}{dt}/V + \frac{a \cdot \gamma}{V} - \delta_f \right), \text{ and} \qquad \text{Eq. 2}$$

$$Y_r = -C_f \cdot \alpha_r = -C_r \left( \frac{dy}{dt}/V - \frac{b \cdot \gamma}{V} + k \cdot \delta_f \right).$$

If, in this instance, it is assumed that the vehicle is making a turn at a constant velocity, then $d^2y/dt^2=0$ and $d\gamma/dt=0$ so that Equation 1 can be rewritten as $$M \cdot V \cdot \gamma = Y_f + Y_r \qquad \text{Eq. 3}$$
$$a \cdot Y_f = b \cdot Y_r$$

Solution of these equations for the side slip angle gives, in consideration of the relation $$\beta = \frac{dy}{dt}/V$$

$$\beta = \frac{l(b - a \cdot k)/V^2 - M(a/C_r + b \cdot k/C_f)}{l^2/V^2 - M(a/C_r - b/C_f)} \delta_f$$

In order to eliminate the side slip angle $\beta$ as contemplated in the present invention, it is necessary that the following relationship holds:

$$l(b-a\cdot k)/V^2 - M(a/C_r + b\cdot k/C_f) = 0$$

When this relationship is established, the rear/front steering-angle ratio k of the angle through which the rear road wheel is to be steered versus the angle $\delta_f$ through which the front road wheel is steered is given by $$k = \frac{b \cdot l - M \cdot V^2(a/C_r)}{a \cdot l + M \cdot V^2(b/C_f)} \qquad \text{Eq. 4}$$

It is thus seen that the side slip angle $\beta$ of the vehicle making a turn can be reduced to zero when the rear road wheel is steered through the angle determined by the ratio k given by Equation 4. The angle through which the rear road wheel is to be steered is expressed as $$\delta_r = k \cdot \delta_f \qquad \text{Eq. 5}$$

From Equations 4 and 5 above, it is seen that the rear/front steering-angle ratio k and accordingly the angle $\delta_r$ through which the rear road wheel is to be steered is determined when the vehicle speed V, the total sprung mass M of the vehicle, the front-wheel steering angle $\delta_f$ and the distances a and b between the center of gravity Pg of the vehicle and the center axes Pa and Pb of the front and rear wheel axles, respectively, are known. The sprung mass M of vehicle in particular varies with the tare weight of the vehicle, the amount of load carried by the vehicle, the distance a between the center of gravity Pg and the center axis Pa of the front wheel axle and the distance b between the center of gravity Pg and the center axis Pb of the rear wheel axle. The changes in the total sprung mass M of the vehicle are, however, practically negligible compared to the changes in the vehicle speed V and the front-wheel steering angle $\delta_f$. For this reason, the total sprung mass M of the vehicle can be deemed as practically fixed for a vehicle of a given make and can accordingly be considered to be a fixed value which is proper to the vehicle.

Figure 4:
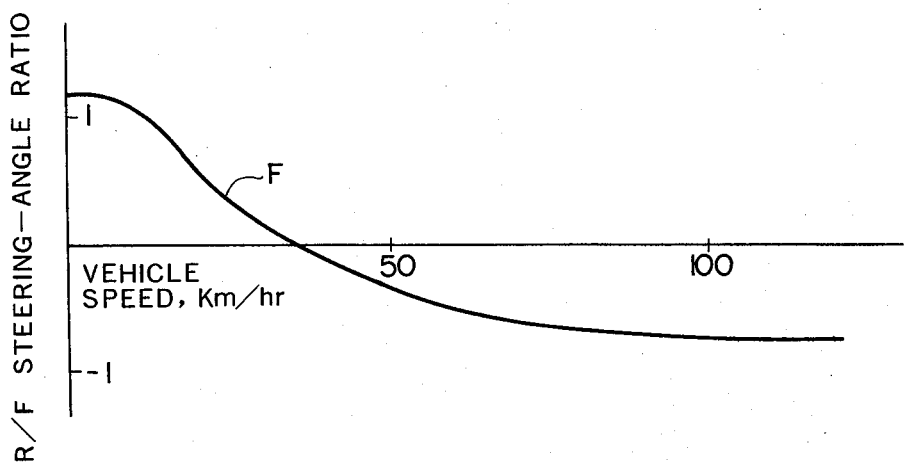
FIG. 4 is a graph showing the relationship between vehicle speed and the ratio of the front wheel steering angle to the rear wheel steering angle.

When the total sprung mass M of the vehicle is thus given as a predetermined value, the side slip angle $\beta$ of the vehicle shown in modelled form in FIG. 3 can be eliminated if the ratio k between the front-wheel and rear-wheel steering angles $\delta_f$ and $\delta_r$ is varied with the vehicle speed V with a predetermined functional relationship established therebetween as, for example, indicated by curve F in FIG. 4 of the drawings.

In the arrangement illustrated in FIG. 1 of the drawings, the vehicle speed V is detected by the vehicle-speed sensor 17 and the front-wheel steering angle $\delta_f$ is detected by the front steering-angle sensor 19. On the other hand, the distance a between the center of gravity Pg and the center axis Pa of the front wheel axle can be determined on the basis of each of the sprung masses of the vehicle which are carried by the front road wheels 33 and 34 and which are detected by the front sprung-mass sensors, not shown. Likewise, the distance b between the center of gravity Pg and the center axis of the rear wheel axle can be determined on the basis of each of the sprung masses of the vehicle which are carried by the rear road wheels 24 and 25 and which are detected by the rear sprung-mass sensors, not shown. If, in this instance, each of the sprung masses detected by the front sprung-mass sensors is denoted as Mf and each of the sprung masses detected by the rear sprung-mass sensors is denoted as Mr, then the distances a and b are expressed in terms of the sprung masses Mf and Mr as $$a = l \times M_r/M \text{ and } b = l \times M_f/M \qquad \text{Eq. 6}$$

The control unit 16 in the arrangement shown in FIGS. 1 and 2 of the drawings has preliminarily stored therein the respective values of the total sprung mass M and the wheel base l of the vehicle. The distances a and b are thus calculated in the control unit 16 in accordance with Equation 6 above on the basis of the sprung mass Mf represented by each of the signals from the front sprung-mass sensors and the sprung mass Mr represented by each of the signals from the rear sprung-mass sensors. The control unit 16 has further stored therein the values of the cornering powers Cf and Cr of the front and rear wheel tires and is operative to calculate the rear/front steering-angle ratio k in accordance with Equation 4 on the basis of the distances a and b thus calculated as well as the vehicle speed V represented by the signal from the vehicle speed sensor 17. If desired, the control unit 16 may be otherwise designed to be operative in such a manner as to calculate the rear/front steering-angle ratio k on the basis of the distances a and b and a suitable fixed parameter.

The rear/front steering-angle ratio k thus calculated is multiplied by the front-wheel steering angle $\delta_f$ represented by the signal supplied from the front steering angle sensor 19 to the control unit 16. In this fashion, the control unit 16 produces an output signal representative of the product of the calculated rear/front steering-angle ratio k and the detected front-wheel steering angle $\delta_f$ and accordingly the angle $\delta_r$ through which each of the rear road wheels 24 and 25 is to be steered. The signal thus supplied from the control unit 16 is compared with the signal from the rear steering-angle sensor 23 and is corrected if there is an error between the desired rear-wheel steering angle $\delta_r$ and the detected rear-wheel steering angle represented by the signal from the sensor 23.

When it is assumed that $b \cdot l = A$, $M(a/Cr) = B$, $a \cdot l = C$ and $M(b/Cf) = -D$, Equation 5 can be re-written in the form of $$k = (A - B \cdot V^2)/(C - D \cdot V^2) \qquad \text{Eq. 4'}$$

The parameters A, B, C and D may be calculated from the values of M, l, a, b, Cr, and Cf. In accordance with the present invention, however, it is proposed that the parameters A, B, C and D be experimentally predetermined in such a manner that the functional relationship represented by the curve F shown in FIG. 4 is established between the ratio k and the vehicle speed V.

If, however, the front wheels are steered such that the ratio between the rotation of the steering wheel as the driver steers and the angle of the front wheels is constant, and only the rear wheels change the steering angle ratio with respect to the front wheels according to the vehicle speed, the front wheels would be opposed to the back wheels at relatively low speeds, and all the wheels would be pointing in the same direction at relatively high speeds as seen from FIG. 4. In such a method of steering the rear wheels to make the side slip angle small, the relationship between the vehicle speed and the yawing rate gain would be shown by the broken line A in FIG. 5, where, as the vehicle speed increases, the yawing rate gain decreases. If the vehicle is travelling on a level surface at a speed V (meters per second) the theoretical relationship between the yawing rate r (radians per second) and radius of the turning circle R (meters) can be shown to be:

$$R = V/r$$

Consequently, when the speed of the vehicle increases but the yawing rate is not increased, the radius of the turning circle cannot be kept constant but tends to increase, causing apparent under-steering characteristics to develop.

As is obvious from above, when the rear wheels are steered so as to make the side-slip angle small, apparent severe understeering would be developed with increasing vehicle speed. If this occurs on a bend on a high-speed road for example, while intending to turn in a circle of constant radius while steering at a constant steering angle, the bad situation would be created in which as the speed gradually increases, the rear wheels would move into alignment with the front wheels and the radius of the turning circle would increase. Consequently, if the speed drops due to braking while turning and maintaining a constant steering angle, the rear wheels would turn so as to be in a different direction from the front wheels, and an undesirable condition known as "tack-in" would occur in which the vehicle is misaligned with the direction of travel or similar phenomena.

Figure 5:
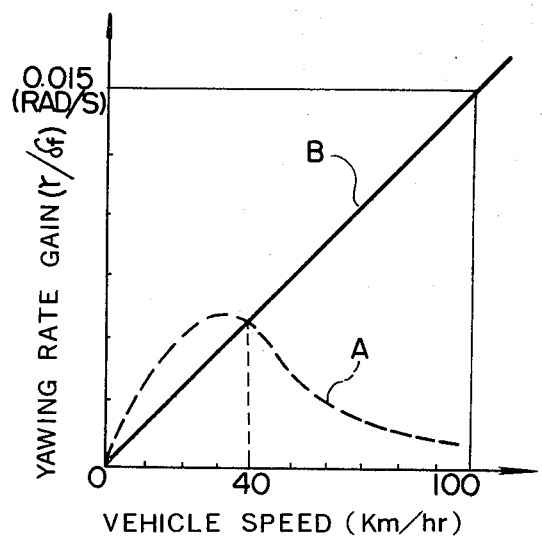
FIG. 5 is a graph showing the relationship between vehicle speed and yawing rate gain.

In order to preclude these problems, at the same time when the rear wheels are steered so as to make the side-slip angle small, the steering angle of the front wheels should be increased with increasing vehicle speed so that the yawing rate gain is of "neutral steer", as shown by the solid line in FIG. 5, or of moderate understeer.

When the vehicle is making a turn at a constant speed, the yawing rate $\gamma$ is given by eliminating dy/dt from Equations 2 and 3 and rearranging the resulting equation:

$$\gamma = \frac{l(1 + k)}{V\left\{ \frac{l^2}{V^2} - m\left( \frac{a}{Cr} - \frac{b}{Cf} \right) \right\}} \cdot \delta f \qquad \text{Eq. 7}$$

On the other hand, with a usual vehicle of the type in which the rear wheels are not steered, the yawing rate $\gamma'$ is represented by:

$$\gamma' = \frac{l}{V\left\{ \frac{l^2}{V^2} - m\left( \frac{a}{Cr} - \frac{b}{Cf} \right) \right\}} \cdot \delta f \qquad \text{Eq. 8}$$

because $k = 0$.

That is, by comparing Equations 7 and 8, it will be seen that, for the same front wheel steering angle, the yawing rate $\gamma$ increases at relatively low speeds compared with that of the usual vehicle since k is larger than zero whereas it decreases at relatively high speeds since k is smaller than zero.

In order to eliminate the influence of the factor k on Equation 7, the front wheel steering angle should be adjusted such that a yawing rate equal to the yawing rate of the usual vehicle is created by the steering angle $\delta f_D$ of the steering wheel of this vehicle. In other words, it is necessary that the following equation holds:

$$\delta f = \frac{1}{1 + k} \times \frac{\delta f_D}{k_D} = \frac{e}{1 + k} \times \delta f_D \qquad \text{Eq. 9}$$

where $k_D = \delta f / \delta f_D =$ constant, and e is a constant.

The value of k is greater than $-1$ so that:

$$\frac{e}{1 + k} > 0$$

Therefore, with high speed, the steering angle of the steering wheel is increased in the direction of steering whereas with relatively low speed, the steering angle is decreased.

Thus it will be seen from Equations 5 and 9 that the rear steering angle $\delta r$ is represented as:

$$\delta r = k \cdot \delta f = k \cdot \frac{1}{1 + k} \cdot \frac{\delta f_D}{k_D}$$

Thus an electrical signal representing $\delta f$ calculated by Equation 9 is outputted from the control unit 16 through the front wheel steering servo amplifier 35 to the front servo valve 29 to steer the front wheels, on a feed-back control basis.

As described above, according to the invention, the arrangement is such that the front wheel steering angle is variable with respect to the steering angle of the steering wheel controlled by the driver according to the vehicle speed so that the side-slip angle is minimized and excessive understeer effect and "tack-in" during braking occurring in vehicles with steerable rear wheels are prevented.

While the invention has been described with respect to a preferred embodiment thereof, various changes and variations thereof could be made by those skilled in the art without departing from the scope and spirit of the invention as set forth in the attached claims.

What is claimed is:

1. A method of steering a wheeled vehicle having a pair of rear steerable road wheels, a pair of front steerable road wheels, and a steering wheel for controlling a steering force applied to the pair of front steering road wheels, comprising the steps of:
   (a) sensing the vehicle speed;
   (b) sensing the angle $\delta f_D$ through which said steering wheel is turned;
   (c) controlling the angle $\delta f$ through which the pair of front steering road wheels is turned to $e \cdot \delta f_D/(1+k)$ where e is a constant and k is a function of a detected vehicle speed; and
   (d) controlling the angle $\delta r$ through which the pair of rear steering road wheels is turned to $K \cdot \delta f$.

2. The method of claim 1, wherein k is $(A-BV^2)/(C-DV^2)$ where $A=b \cdot l=l^2 \times M_f/M$ where b is the distance between the center axis of the rear axle and the center of gravity of the vehicle, l is the wheel base of the vehicle, $M_f$ is each sensed front sprung mass of the vehicle, and M is the total sprung mass of the vehicle; $B=M(a/C_r)=M(l \times M_r/M/C_r)$ where $M_r$ is each sensed rear sprung mass of the vehicle, and $C_r$ is the cornering power of the rear wheel; $C=a \cdot l=l^2 \times M_r/M$ where a is the distance between the center axis of the front axle and the center of gravity of the vehicle; and D is $-M(b/C_f)$ where $C_f$ is the cornering power of the front wheel.

3. The method of claim 1 wherein the ratio k is given by $$(A-B \cdot V^2)/(C-D \cdot V^2)$$

wherein V is a detected vehicle speed and $A=b \cdot l=l^2 \times M_f/M$ where b is the distance between the center axis of the rear axle and the center of gravity of the vehicle, l is the wheel base of the vehicle, $M_f$ is each sensed front sprung mass of the vehicle, and M is the total sprung mass of the vehicle; $B=M(a/C_r)=M(l \times M_r/M/C_r)$ where $M_r$ is each sensed rear sprung mass of the vehicle, and $C_r$ is the cornering power of the rear wheel; $C=a \cdot l=l^2 \times M_r/M$ where a is the distance between the center axis of the front axle and the center of gravity of the vehicle; and D is $-M(b/C_f)$ where $C_f$ is the cornering power of the front wheel.

4. A system for steering a wheeled vehicle having a pair of rear steerable road wheels, a pair of front steerable road wheels, and a steering wheel for controlling a steering force applied to the pair of front steering road wheels, said system comprising:
   (a) a front servomechanism for controlling the pair of front steerable road wheels;
   (b) a rear servomechanism for controlling the pair of rear steerable road wheels;
   (c) a vehicle-speed sensor for sensing the vehicle speed to output a speed signal representing the vehicle speed;
   (d) a steering wheel angle sensor for sensing the angle $\delta f_D$ through which the steering wheel is steered to output a signal representing the steered angle; and
   (e) a control unit responsive to the signals from said vehicle-speed sensor and said steering wheel angle sensor for producing to said rear servomechanism a rear control signal representing the angle $\delta r$ through which the pair of rear steerable wheels are to be steered, and to said front servomechanism a front control signal representing the angle $\delta f$ through which the pair of front steerable wheels are to be steered, the rear control signal $\delta r$ being given by $$K \cdot \delta f$$

where k is a function of a sensed vehicle speed, and the front control signal being given by $$e \cdot \delta f_D/(1+K)$$

where e is a constant and $\delta f_D$ is the angle through which the steering wheel is turned.

5. The system of claim 4, wherein said rear servomechanism includes a rear actuator for actuating said rear linkage, a rear amplifier having an input for receiving the rear wheel control signal and an output for producing a corresponding amplified signal, a rear servo valve responsive to the amplified signal for controlling said rear actuator, and a rear displacement sensor for sensing the steering angle of said rear wheels to produce a signal representing the steering angle of the rear wheels, said rear displacement sensor being connected to said servoamplifier so as to feed back the signal from said displacement sensor to the input of said amplifier.

6. The system of claim 4 or 5, wherein said front servomechanism includes a front actuator for actuating said front linkage, a front amplifier having an input for receiving the front wheel control signal and an output for producing a corresponding amplified signal, a front servo valve responsive to the amplified signal for controlling said front actuator, and a front displacement sensor for sensing the steered angle of said front wheels to produce a signal representing the steered angle of the front wheels, said front displacement sensor being connected to said front amplifier so as to feed back the signal from said front displacement sensor to the input of said front amplifier.

7. The system of claim 4, wherein k is $(A-BV^2)/(C-DV^2)$ where $A=b \cdot l=l^2 \times M_f/M$ where b is the distance between the center axis of the rear axle and the center of gravity of the vehicle, l is the wheel base of the vehicle, $M_f$ is each sensed front sprung mass of the vehicle, and M is the total sprung mass of the vehicle; $B=M(a/C_r)=M(l \times M_r/M/C_r)$ where $M_r$ is each sensed rear sprung mass of the vehicle, and $C_r$ is the cornering power of the rear wheel; $C=a \cdot l=l^2 \times M_r/M$ where a is the distance between the center axis of the front axle and the center of gravity of the vehicle; and D is $-M(b/C_f)$ where $C_f$ is the cornering power of the front wheel.

* * * * *